United States Patent
Inamoto

(10) Patent No.: US 7,258,453 B2
(45) Date of Patent: Aug. 21, 2007

(54) PROJECTOR

(75) Inventor: Masayuki Inamoto, Saitama (JP)

(73) Assignee: Fujinon Corporation, Saitama (JP)

( * ) Notice: Subject to any disclaimer, the term of this patent is extended or adjusted under 35 U.S.C. 154(b) by 83 days.

(21) Appl. No.: 11/087,689

(22) Filed: Mar. 24, 2005

(65) Prior Publication Data
US 2005/0213058 A1 Sep. 29, 2005

(30) Foreign Application Priority Data
Mar. 24, 2004 (JP) ............................ 2004-087876

(51) Int. Cl.
G03B 21/00 (2006.01)
G03B 21/14 (2006.01)
(52) U.S. Cl. ...................................... 353/122; 353/84
(58) Field of Classification Search ................ 353/122, 353/84
See application file for complete search history.

(56) References Cited

U.S. PATENT DOCUMENTS

| 5,993,012 A | * | 11/1999 | Buchanan et al. | ........... 353/119 |
| 6,547,400 B1 | | 4/2003 | Yokoyama | .................... 353/98 |
| 6,769,773 B1 | * | 8/2004 | Wu | .............................. 353/33 |
| 6,796,655 B2 | | 9/2004 | Seki | ............................ 353/20 |
| 2006/0033891 A1 | * | 2/2006 | Engle | .......................... 353/119 |

FOREIGN PATENT DOCUMENTS

JP 2003-186110 7/2003

* cited by examiner

Primary Examiner—Christopher Mahoney
(74) Attorney, Agent, or Firm—Young & Thompson

(57) ABSTRACT

A projector is equipped with: a light emitting diode for emitting light; an image display element to which the light emitted from the light emitting diode is incident and which modulates the incident light and emits the light as image light; and an ultraviolet light incidence preventing member disposed between the light emitting diode and the image display element for preventing ultraviolet light from being incident to the image display element.

19 Claims, 5 Drawing Sheets

PROJECTOR

This application is based on Japanese Patent application JP 2004-087876, filed Mar. 24, 2004, the entire content of which is hereby incorporated by reference. This claim for priority benefit is being filed concurrently with the filing of this application.

BACKGROUND OF THE INVENTION

1. Technical Field of the Invention

The present invention relates to a projector for projecting light supplied with information such as an image or the like onto a screen to display the image on the screen.

2. Description of the Related Art

A projector using a liquid crystal panel or DMD (digital micro-mirror device) has been known as a projector for projecting light supplied with information such as an image or the like to a screen to display the image on the screen. According to a liquid crystal projector using a liquid crystal panel, light irradiated to the liquid crystal panel is transmitted through the liquid crystal panel or light irradiated to the liquid crystal panel is reflected by the liquid crystal panel, whereby image information displayed on the liquid crystal panel is projected to the screen. The image information displayed on the liquid crystal panel is displayed on the screen while being enlarged.

The liquid crystal projector is equipped with an illumination device for illuminating light to the liquid crystal panel, and an illumination optical system for uniformly irradiating light from the illumination device onto the liquid crystal panel is provided in front of the illumination device. The illumination optical system contains a lens, a polarization converting element, etc., and the light irradiated from the illumination device is irradiated through the illumination optical system to the liquid crystal panel. It is preferable that the liquid crystal panel is illuminated with bright and uniform light, and thus it is desired that the light irradiated from the illumination device has high brightness and the light flux thereof is uniform. Accordingly, it has been general to use as the illumination device a high-luminance discharge lamp which can light having brightness (high luminance) needed to project an image on the liquid crystal panel such as an ultra-high pressure mercury lamp, a metal halide lamp, a xenon lamp or the like.

The high-luminance discharge lamp is heated, and thus it is necessary to provided a large-scale cooling device for cooling the lamp. However, when the cooling device is provided, there is a problem that the illumination device must be designed in a large size and further the manufacturing cost of the projector is increased. Furthermore, it has been required to reduce the cost when the projector is used, for example, to reduce the power to be consumed to irradiate high-brightness light and further to lengthen the period for which the high-luminance discharge lamp can be used.

Therefore, it has been recently considered that a light emitting diode (hereinafter referred to as "LED") is used as an illumination device in place of the ultra-high discharge lamp. LED has advantages that it is more compact in size, lighter in weight, smaller in power consumption and longer in lifetime, it can be driven with a low voltage and it has a high response speed when it is subjected to turn-on control as compared with the ultra-high discharge lamp described above. However, light emitted from LED is diffused over a broad range, and thus JP-A-2003-186110 has proposed a method of focusing light emitted from LED by a lens. Furthermore, a while-color LED for emitting white light is used as LED used for the illumination device.

There are some types of LEDs for emitting white light. One of these types of LEDs comprises a combination of an element for generating ultraviolet light and a white fluorescent material for emitting light upon reception of ultraviolet light (a mixture of plural kinds of primary color fluorescent materials). With this type, the whole ultraviolet light thus generated is not necessarily converted to white light, and a part of the light may leak to the outside. Even in other types of LEDs, leakage of ultraviolet light is unavoidable in some constructions. Furthermore, orientation film of the liquid crystal panel is weak to ultraviolet light, and the lifetime of the present liquid crystal panel is greatly affected by a total irradiation amount of ultraviolet light. Accordingly, when a liquid crystal projector is constructed by using LED as an illumination device, it is important to treat ultraviolet light thus leaking, and the JP-A-2003-186110 and other techniques have hardly paid attention to the above matter.

SUMMARY OF THE INVENTION

The present invention has an object to provide a projector which can prevent ultraviolet light leaking from a white light emitting diode from being irradiated to a liquid crystal panel although the white light emitting diode is used.

A projector according to the present invention is characterized by comprising: a light emitting diode for emitting light; an image display element to which the light emitted from the light emitting diode is incident and which modulates the incident light and emits the light as image light; and an ultraviolet light incidence preventing member disposed between the light emitting diode and the image display element for preventing ultraviolet light from being incident to the image display element.

The ultraviolet light incidence preventing member is preferably constructed by a member for absorbing or reflecting the ultraviolet light.

According to the projector of the present invention, it is equipped with the light emitting diode for emitting light, the image display element to which the light emitted from the light emitting diode is incident and which modulates the incident light and emits the light as image light, and the ultraviolet light incidence preventing member disposed between the light emitting diode and the image display element for preventing ultraviolet light from being incident to the image display element. Therefore, the ultraviolet light leaking from the light emitting diode is irradiated forwardly although the light emitting diode is used, and thus the ultraviolet light is prevented from being incident to the image display element.

The ultraviolet light incidence preventing member is constructed by the member for absorbing or reflecting ultraviolet light, so that ultraviolet light leaking from the light emitting diode can be irradiated forwardly and prevented from being incident to the image display element.

DETAILED DESCRIPTION OF THE INVENTION

Figure 1:
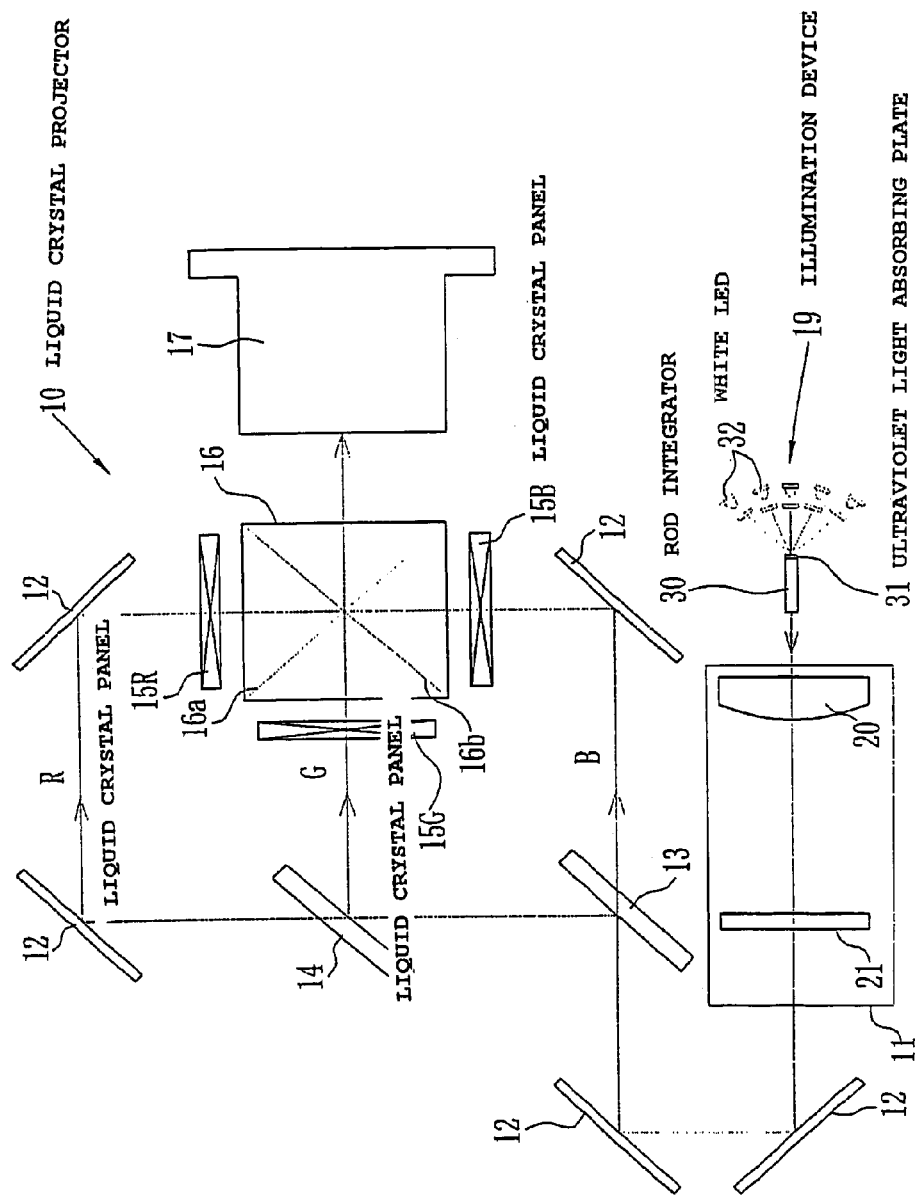
FIG. 1 is a diagram showing the construction of one embodiment of a projector used for the invention.

In FIG. 1, a liquid crystal projector 10 is equipped with an illumination optical system 11, a mirror 12 for varying an irradiation direction of irradiated light, dichroic mirrors 13, 14, three transmission type liquid crystal panels (image display elements) 15R, 15G, 15B, a cross dichroic prism 16, a projection lens 17, a screen 18 and an illumination device 19.

The illumination optical system 11 is equipped with a lens 20 and a polarization converting element 21. White light containing red light (R light), green light (G light) and blue light (B light) are irradiated from the illumination device 19 to the downstream side thereof. The light irradiated from the illumination device 19 is incident to the lens 20. The light incident to the lens 20 is collimated and then irradiated to the downstream side of the lens 20. The polarization converting element 21 is disposed at the downstream side of the lens 20. The polarization converting element 21 transmits light irradiated from the illumination device 19 therethrough to convert the light to R light, G light and B light having no specific polarization plane to S-polarized light. Each color light transmitted through the polarization converting element 21 is reflected by the mirror 12 and then incident to the dichroic mirror 13.

The dichroic mirror 13 transmits B light contained in white light and reflects R light and G light to separate the B light. The B light thus separated is reflected by the mirror 12 and incident to the liquid crystal panel 15B. The R light and the G light reflected by the diachronic mirror 13 are incident to the diachronic mirror 14. The diachronic mirror 14 transmits the R light therethrough and reflects the G light to separate the R light and the G light from each other. The R light transmitted through the dichroic mirror 14 is reflected from the mirror 12, and incident to the liquid crystal panel 15R. The G light reflected by the dichroic mirror 14 is incident to the liquid crystal panel 15G.

In the liquid crystal panels 15R, 15G, 15B, the R light, the G light and the B light incident thereto are supplied with image information. The light flux of the R light, the G light and the B light transmitted through the liquid crystal panels 15R, 15G, 15B is incident to the cross dichroic prism 16. The cross dichroic prism 16 comprises a combination of four rectangular prisms. The cross dichroic prism 16 has two kinds of dichroic faces of a R light reflection face 16a for reflecting R light and a B light reflection face 16b for reflecting B light, and the orthogonal prisms thereof are arranged so that the R light reflection face 16a and the B light reflection face 16B are orthogonal to each other.

When the R light transmitted through the liquid crystal panel 15R is reflected by the R light reflection face 16a, the irradiation direction of the R light is varied so as to be orthogonal to the transmission direction of the R light through the liquid crystal panel 15R so that the reflected R light is directed to the projection lens 17, and thus the R light is incident to the projection lens 17. The G light transmitted through the liquid crystal panel 15G is transmitted through the R light reflection face 16a and the B light reflection face 16b, straightly travel and then are incident to the projection lens 17. When the B light transmitted through the liquid crystal panel 15B is reflected by the B light reflection face 16b, the irradiation direction of the B light is varied so as to be orthogonal to the transmission direction of the B light through the liquid crystal panel 15B so that the reflected B light is directed to the projection lens 17, and thus the B light is incident to the projection lens 17. The projection lens 17 projects the light flux of the respective color light combined by the cross dichroic prism 16 while enlarging each color light flux, and focuses them onto the screen 18 (not shown), whereby the image information is displayed on the screen 18.

Figure 2:
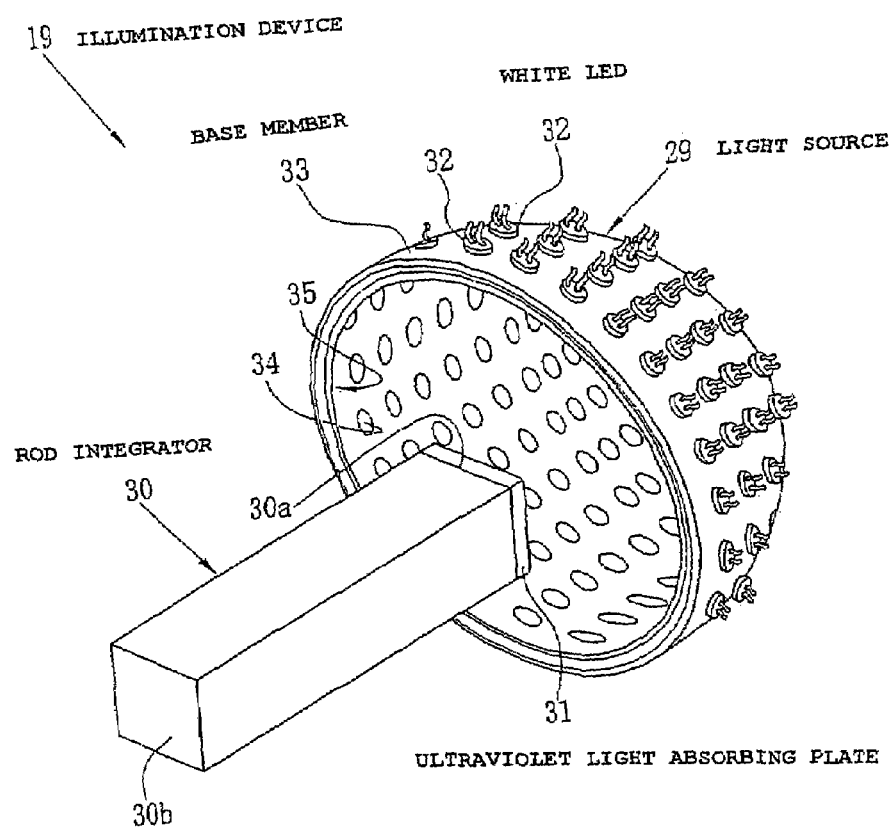
FIG. 2 is a perspective view showing one embodiment of the outlook of an illumination light source device of the invention.
Figure 3:
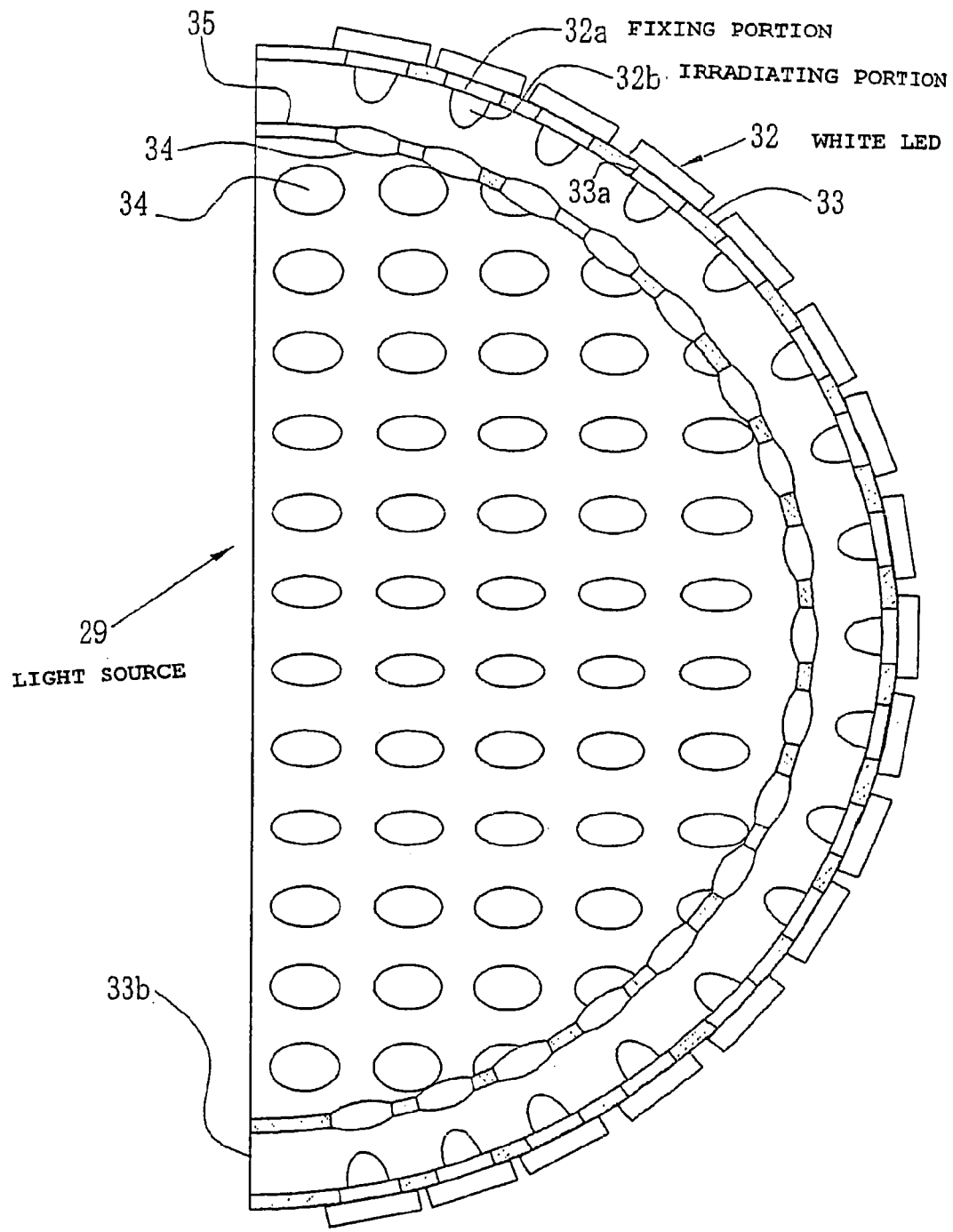
FIG. 3 is a cross-sectional view showing one embodiment of a light source of the invention.

As shown in FIGS. 2 and 3, the illumination device 19 is equipped with a light source 29, a rod integrator 30 and an ultraviolet light absorbing plate (ultraviolet light incidence preventing member) 31.

The light source 29 comprises plural white LEDs (light emitting diodes) 32 for emitting white light, a base member 33 to which the white LEDs 32 are mounted, and a lens array 35 having plural condensing lens 34 for condensing light emitted from the white LEDs.

Each of the white LEDs 32 has a fixing portion 32a to be fixed to the base member 33 and an irradiation portion 32b for irradiating light. The base member 33 is designed in a semispherical shape having a hollow portion therein, and plural holes 33a are formed in the outer peripheral surface of the base member 33 so as to be spaced from one another at predetermined intervals. The fixing portion 32a is engagedly fitted in each hole 33a so that the irradiation portion 32b faces the inside of the base member 33, whereby the white LEDs 32 are fixed to the base member 33.

The plural condensing lenses 34 are fixed to the lens array 35 so as to be arranged in the same interval as the holes 33a. An opening portion 33b is formed at the flat front surface of the base member 33 so as to intercommunicate with the hollow portion in the base member 33. The lens array 35 is inserted from the opening portion 33b and fixed in the base member 33. When the lens array 35 is fixed, each of the plural condensing lenses 34 faces each of the irradiation portions 32b of the while LEDs 32 fixed to the base member 33. The heating amount of the while LEDs is set to a level that resin can be used as the material of the condensing lenses 34, and thus it is preferable that the condensing lenses 34 may be formed integrally with the lens array 35. Accordingly, even when the lens array 35 is designed in a complicated shape, the light source can be simply manufactured.

The rod integrator 30 is formed of transparent material to have a quadratic-prism shape. A surface of the rod integrator 30 which is located at one end side thereof in the longitudinal direction and faces the opening portion 33a serves as an incidence face 30 to which light irradiated from white LEDs 32 is incident, and a surface of the rod integrator 30 which is located at the opposite side to the incidence face 30a serves as an irradiation face 30b from which light incident from the incidence face 30a is irradiated to the outside.

The ultraviolet absorbing plate (ultraviolet light incidence preventing member) 31 is fixed to the incidence 30a of the rod integrator 30. The ultraviolet light absorbing plate 31 absorbs ultraviolet light (light of substantially 430 nm or less in wavelength) out of light irradiated from the white LEDs 32, and it is formed of material through which white light is transmitted. Accordingly, it prevent incidence of ultraviolet light to the rod integrator 30, the lens 20, the liquid crystal panels 15R, 15G, 15B, etc. which are located at the downstream side thereof.

Figure 4:
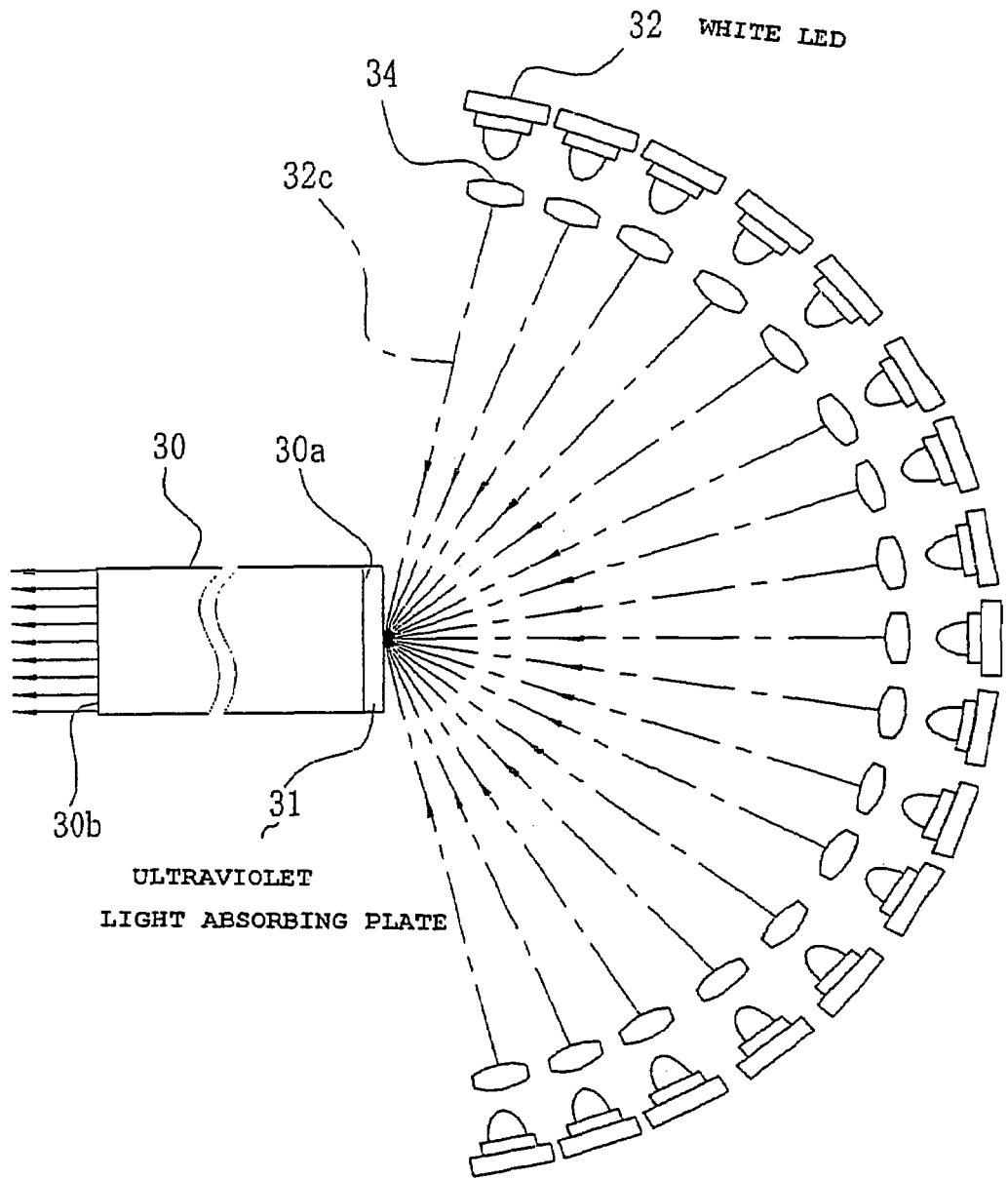
FIG. 4 is a diagram showing an irradiation direction of light irradiated from the white LEDs.

As shown in FIG. 4, when light is irradiated from the white LEDs 32 under the state that the white LEDs 32 are fixed to the base member 33, the irradiation axes 32c each of which serves as the center axis of an irradiation range of light emitted from each white LED 32 extend radially, and also cross one another in a fixed range. The rod integrator 30 is located in front of the opening portion 33*a* of the base member 33 so that the incidence face 30*a* thereof is located in the cross range of the irradiation axes 32*c*.

When light which is irradiated from the white LEDs 32 and then from which ultraviolet light is absorbed by the ultraviolet light absorbing plate 31 is incident to the incidence face 30*a*, the incident light is totally reflected by the inner surface and then irradiated as substantially uniformly collimated light flux from the irradiation face 30*b* to the outside. Accordingly, the irradiation of the light irradiated from the white LEDs 32 is varied, and the light is irradiated to a predetermined range with substantially uniform brightness.

Figure 5:
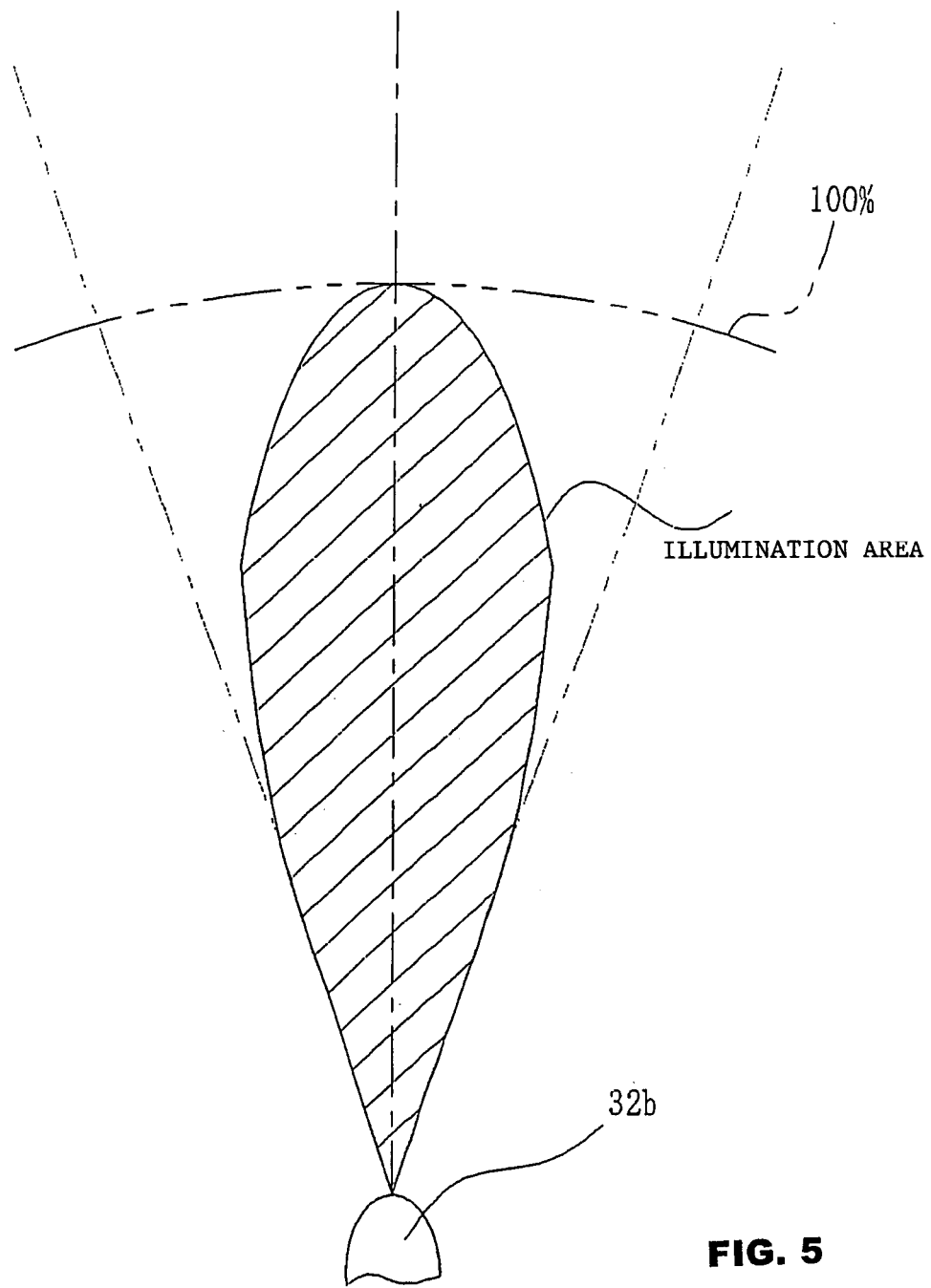
FIG. 5 is a diagram showing the intensity of light irradiated from the white LEDs.

Here, as shown in FIG. 5, the light irradiated from the white LEDs 32 has a characteristic in that the brightness thereof is highest on the irradiation axis 32*c* and it is gradually reduced toward the periphery of the light. Therefore, if the light irradiated from the white LEDs 32 is used without using any rod integrator 30, the image information on the screen 18 is bright at the center portion thereof and is gradually darkened toward the peripheral portion thereof. Accordingly, the liquid crystal projector 10 can achieve uniformly bright image information by using the rod integrator 30.

Suitable material such as glass, transparent resin such as acrylic resin or the like may be used as the material for the rod integrator 30 insofar as it is transparent material having a refractive index different from air. Furthermore, the shape of the rod integrator 30 is not limited to the quadratic prism, but it may be any suitable shape. It may be designed to have a hollow cylindrical shape. When the inside of the rod integrator 30 is designed to have a hollow portion therein, the light reflection frequency at the inner surface is increased, so that more uniformly collimated light flux can be achieved.

Next, the operation of the liquid crystal projector thus constructed will be described. When light is irradiated from the white LEDs 32, the light thus irradiated is condensed by the condensing lens 34, and irradiated to the incidence face 30*a* of the rod integrator 30. The ultraviolet light contained in the light irradiated to the incidence face 30*a* of the rod integrator 30 is absorbed by the ultraviolet light absorbing plate 31, and then the light is incident to the incidence face 30*a*, whereby ultraviolet light can be prevented from being incident to the rod integrator 30, the lens 20, the liquid crystal panels 15R, 15G, 15R, etc. located at the downstream side of the ultraviolet light absorbing plate 31. Since the white LEDs 32 are arranged so that the irradiation axes 32*c* of light irradiated from the respective white LEDs 32 cross one another in a fixed range, light having high brightness can be made incident from the incidence face 30*a*.

The light incident from the incidence face 30*a* is totally reflected by the inner surface of the rod integrator 30, and then irradiated as substantially uniformly collimated light flux from the irradiation face 30*b* to the outside. Accordingly, the light irradiated from the white LEDs 32 is irradiated with substantially uniform brightness in a predetermined range while the irradiation direction thereof is varied. The light irradiated from the rod integrator 30 is passed through the cross dichroic prism 16 and the projection lens 17 and then projected onto the screen 18.

As described above, the ultraviolet light of the light irradiated to the incidence face 30*a* of the rod integrator 30 is absorbed by the ultraviolet light absorbing plate 31, and then the light concerned is incident to the incidence face 30*a*. Therefore, ultraviolet light can be prevented from being incident to the rod integrator 30, the lens 20, the liquid crystal panels 15R, 15G, 15B, etc. located at the downstream side of the ultraviolet light absorbing plate 31. Accordingly, the liquid crystal panels 15R, 15G, 15B whose orientation films would be liable to be broken if ultraviolet light is incident thereto can be protected.

In the above embodiment, the ultraviolet light absorbing plate 31 is secured to the incidence face 30*a* of the rod integrator 30, however, the present invention is not limited to this embodiment. It is merely required only to prevent the ultraviolet light of the light irradiated from the white LEDs 32 from being incident to the liquid crystal panels 15R, 15G, 15B. For example, the ultraviolet light absorbing plate 31 may be secured to the irradiation face 30*b* of the rod integrator 30, the incidence face of the lens 20 or the like. In addition, the position at which the ultraviolet light absorbing plate 31 is secured may be suitably changed.

Furthermore, in the above embodiment, as the ultraviolet light incidence preventing member is used an ultraviolet light absorbing plate 31 formed of a material which absorbs ultraviolet light out of light irradiated from the white LEDs 32 and through which white light is transmitted. However, the present invention is not limited to this embodiment, and it is merely required only to prevent ultraviolet light out of light irradiated from the white LEDs 32 from being incident to the liquid crystal panels 15R, 15G, 15B, and as the ultraviolet light incidence preventing member may be used an ultraviolet light reflecting plate formed of a material which reflects ultraviolet light out of light irradiated from the white LEDs 32 and through which white light is transmitted.

Furthermore, the LEDs serving as the light source are not limited to the white LEDs, and for example, a combination of three color LEDs of R, G and B may be used as a light source of the projector.

Still furthermore, the present invention is not limited to the transmission type liquid crystal projector 10 in which light irradiated to the liquid crystal panel is transmitted therethrough, but it may be applied to a reflection type projector in which light irradiated to a liquid crystal panel is reflected therefrom, a projector using DMD or other projectors.

What is claimed is:

1. A projector comprising:
    a light emitting diode that emits white light containing red light, green light, and blue light;
    an image display element to which the light emitted from the light emitting diode is incident and which modulates the incident light and emits the modulated light as an image light; and
    an ultraviolet light incidence preventing member that is disposed between the light emitting diode and the image display element, and prevents an ultraviolet light from being incident to the image display element.

2. The projector according to claim 1, wherein the ultraviolet light incidence preventing member comprises a member that absorbs the ultraviolet light.

3. The projector according to claim 1, wherein the ultraviolet light incidence preventing member comprises a member that reflects the ultraviolet light.

4. A projector comprising:
    a plurality of light emitting diodes emitting LED light, the LED light containing red light, green light, blue light, and ultraviolet light;

an ultraviolet light incidence preventing member upon which the LED light is incident and from which transmitted light is emitted, the transmitted light containing the red light, the green light, and the blue light, the transmitted light being free of the ultraviolet light; and an imaging element arranged to receive the transmitted light and to produce projection light.

5. The projector of claim 4, wherein each of the plurality of light emitting diodes is a white LED that emits white light containing red light, green light, and blue light.

6. The projector of claim 4, wherein the plurality of light emitting diodes comprises red LEDs that emit red light, green LEDs that produce green light, and blue LEDs that produce blue light.

7. The projector of claim 4, wherein the ultraviolet light incidence preventing member absorbs the ultraviolet light.

8. The projector of claim 4, wherein the ultraviolet light incidence preventing member reflects the ultraviolet light.

9. The projector of claim 4, wherein the imaging element comprises a light separator that separates the transmitted light into separate red, green, and blue light beams.

10. The projector of claim 9, wherein the imaging element comprises red, green, and blue image display elements upon which the red, green, and blue light beams are incident, respectively, thereby producing red, green, and blue image light, respectively.

11. The projector of claim 10, wherein the imaging element combines the red, green, and blue image light to produce the projection light.

12. The projector of claim 11, wherein each of the plurality of light emitting diodes is a white LED that emits white light containing red light, green light, and blue light.

13. The projector of claim 12, wherein the ultraviolet light incidence preventing member absorbs the ultraviolet light.

14. The projector of claim 12, wherein the ultraviolet light incidence preventing member reflects the ultraviolet light.

15. The projector of claim 11, wherein the plurality of light emitting diodes comprises red LEDs that emit red light, green LEDs that produce green light, and blue LEDs that produce blue light.

16. The projector of claim 15, wherein the ultraviolet light incidence preventing member absorbs the ultraviolet light.

17. The projector of claim 15, wherein the ultraviolet light incidence preventing member reflects the ultraviolet light.

18. The projector of claim 11, wherein the ultraviolet light incidence preventing member absorbs the ultraviolet light.

19. The projector of claim 11, wherein the ultraviolet light incidence preventing member reflects the ultraviolet light.

* * * * *